May 29, 1945.  H. RINIA  2,377,268
OPTICAL SYSTEM
Filed Jan. 16, 1941
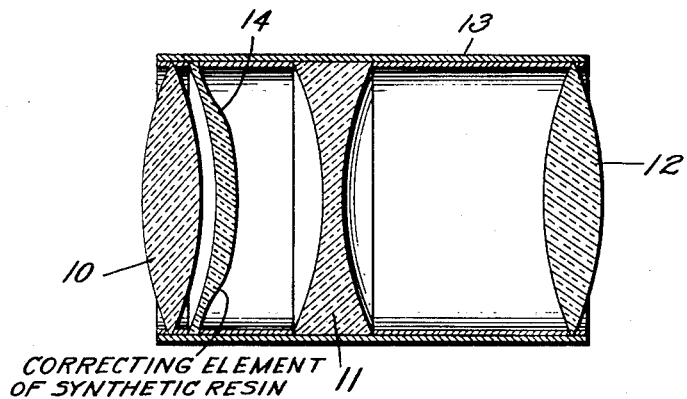
Inventor.
Herre Rinia Patented May 29, 1945

2,377,268

UNITED STATES PATENT OFFICE 2,377,268

OPTICAL SYSTEM

Herre Rinia, Eindhoven, Netherlands; vested in the Alien Property Custodian

Application January 16, 1941, Serial No. 374,765
In the Netherlands October 10, 1939

1 Claim. (Cl. 88—57)

Lenses made as spectacle glasses and consisting of moulding material, such as polystyrol, are known. It has been found, however, that this kind of lenses is rather inaccurate. This kind of lenses therefore has hitherto been used exclusively in optical systems wherein great accuracy was not required. Lenses of moulding material have not been successfully used hitherto in cases wherein great accuracy is required of the system in which they are used and wherein the quality of the system plays a determinative part, as is the case, for example, with telescopes, cameras, projectors, spectrographs, microscopes or similar instruments.

Applicant has found that in certain instances lenses of the said kind can nevertheless be successfully used for the said and similar precision instruments, i. e., for correcting purposes.

The optical system according to the invention comprises a correcting element having an aspherically refracting surface for the correction of spherical aberration, said element consisting of an artificial material or a synthetic resin, more particularly those artificial materials or synthetic resins which are capable of being moulded, capable of being die-cast or capable of being extruded. As an example of such an optical system wherein the correcting element may be made in this manner, I may mention the optical system of Schmidt, as described in the "Zentralzeitung für Mechanik und Optik," volume 52, 1931, number 2.

It was customary to make this kind of correcting elements from glass or quartz. The grinding of these elements, which is necessary to give the surface of the element the desired very complicated profile, is very expensive, however, due to the aspherical shape of the surface.

If the correcting elements are made according to the invention this drawback is completely eliminated. Any desired number of correcting elements may be manufactured with the aid of a single matrix, for example by moulding, casting, die-casting, extrusion, and similar processes, said elements being ready for use either without or after a very insignificant after-treatment, such as polishing of the surface. Such a manufacturing method is considerably less expensive and takes considerably less time than the method hitherto used. A very large number of materials enters into consideration for the correcting element used in the optical system according to the invention.

As examples of materials which can be given the desired shape by moulding or die-casting, I may mentioned certain benzyl-cellulose moulding materials, pheno-plastics, amino-plastics and similar materials. A nitro-cellulose moulding material wherein certain materials are added to nitro-cellulose as a solvent, so that the product known under the registered trade-mark "trolyte F" is obtained, enters also into consideration.

Some of the said materials can also be given the desired shape by extrusion. As further examples of materials which can be worked by die-casting to form the correcting element according to the invention, I may also mention synthetic resins consisting of polymerised vinyl-compounds, such as polystyrol, mixed polymerisates, resins capable of being die-cast, for example phenol-resins capable of being die-cast or similar materials. Further, use may also be made of metacryl-acid esters for the purpose set.

It appears that the above-stated drawback involved by these materials, i. e., that lenses of this kind of materials are inaccurate, does not occur with correcting elements as referred to above, which is probably due to the fact that these correcting elements exhibit only slight differences in thickness, for example of the order of magnitude of a few tenths of millimetres.

As a matter of fact, the correcting element used in the optical system according to the invention will generally also exhibit a definite, though weak optical strength in the paraxial region. The correcting element therefore does not function exclusively as such, though the correcting function is the reason why use is made of such an element.

In one advantageous form of construction of the system according to the invention the correcting element is arranged between two other optical elements of the system, such as, for example, two lenses, a mirror and a lens or a similar combination. This construction offers the advantage that the correcting element is protected from injuries.

An optical system embodying a corrective element according to the invention is shown in the single figure of the drawing forming part of the specification.

The optical system shown in the drawing comprises optical lenses 10, 11 and 12 enclosed within a tube 13 which tube may also serve as a support for the lenses. Spacially interposed between the lenses 10 and 11 is a corrective element 14 according to the invention, said corrective element consisting of an artificial plastic material of the types above described and being formed to the required shape for example by being moulded, die-cast or extruded.

The term "moulded body" in the claim is to be understood to refer to corrective elements shaped by moulding, die-casting or by extrusion.

What I claim is:

An optical system having spherical aberration and comprising two lens components, and a corrective element interposed between the lens components for correcting the spherical aberration of said systm, said element having a thickness variation of the order of a few tenths of a millimeter and consisting of a moulded body of transparent artificial plastic material.

HERRE RINIA.